(12) United States Patent
Batliner et al.

(10) Patent No.: US 7,497,282 B2
(45) Date of Patent: Mar. 3, 2009

(54) DRILL BIT HAVING RADIALLY EXTENDING CUTTING BITS ON RADIAL LEGS

(75) Inventors: Rainer Batliner, Schaanwald (LI); Olaf Koch, Hurlach (DE); Karl-Heinz Hofmann, Weil (DE); Werner Britten, Saarbruecken (DE)

(73) Assignee: Hilti Aktiengesellschaft, Schaan (LI)

( * ) Notice: Subject to any disclaimer, the term of this patent is extended or adjusted under 35 U.S.C. 154(b) by 322 days.

(21) Appl. No.: 11/149,387

(22) Filed: Jun. 9, 2005

(65) Prior Publication Data

US 2005/0274551 A1   Dec. 15, 2005

(30) Foreign Application Priority Data

Jun. 9, 2004   (DE) .................. 10 2004 028 098

(51) Int. Cl.
*E21B 10/40* (2006.01)
(52) U.S. Cl. ...................... 175/415; 175/420
(58) Field of Classification Search .......... 175/414, 175/415, 416, 420, 420.1, 389
See application file for complete search history.

(56) References Cited

U.S. PATENT DOCUMENTS

| | | | | |
|---|---|---|---|---|
| 616,273 A | * | 12/1898 | Strauser et al. | ............ 175/389 |
| 3,145,789 A | * | 8/1964 | Lawry | .............. 175/386 |
| 3,469,641 A | * | 9/1969 | Windley | ............ 175/389 |
| 6,450,273 B1 | * | 9/2002 | Kleine et al. | ............ 175/420.1 |
| 6,588,519 B2 | | 7/2003 | Knoller | |
| 2001/0013430 A1 | | 8/2001 | Hauptmann | |
| 2002/0159851 A1 | | 10/2002 | Krenzer | |

FOREIGN PATENT DOCUMENTS

| | | |
|---|---|---|
| DE | 10053344 A1 | 5/2002 |
| FR | 2779366 | 12/1999 |
| WO | WO0108840 A1 | 2/2001 |
| WO | WO03103914 A1 * | 12/2003 |

OTHER PUBLICATIONS

Claims of EP1604762, corresponding to EP05104990.6, in English, dated Jul. 23, 2007.
Amendment of EP05104990.6, in German, dated May 15, 2007.

* cited by examiner

*Primary Examiner*—David J Bagnell
*Assistant Examiner*—David Andrews
(74) *Attorney, Agent, or Firm*—Abelman, Frayne & Schwab

(57) ABSTRACT

A drill bit for a hammer drill for drilling in stone, concrete and the like includes a drill bit head formed as a hard material body with radial legs and having at least three radially extending cutting bits formed on the radial legs, and a centering tip in a center of the hard material body and projecting beyond one of the cutting bits, with the centering tip having concave limiting surfaces stretching between the linearly extending auxiliary cutting edges.

4 Claims, 2 Drawing Sheets

DRILL BIT HAVING RADIALLY EXTENDING CUTTING BITS ON RADIAL LEGS

BACKGROUND OF THE INVENTION

1. Field of the Invention

The present invention relates to a drill bit, in particular to a drill bit for a hammer drill for drilling in stone, concrete and the like, and including a drilling head formed of a hard material body with radial legs and having at least three radially extending cutting bits formed on the radial legs of the hard material body, and a centering tip provided in a center of the hard material body and projecting beyond one of the cutting bits, with the centering tip having linearly extending auxiliary cutting edges and limiting surfaces stretching between the auxiliary cutting edges.

2. Description of Prior Art

The drilling head of a drill bit is generally formed of a hard material body that is obliquely secured on the end surface of a drill stem. Alternatively, instead of forming the entire drilling head of a hard material, only the working ends of the drill bits are formed of a hard material as hard material inserts which are inserted in respective recesses formed in the drilling head. The drilling head is secured to the drill stem, e.g., by welding or soldering. The hard material inserts can be formed as a one-piece element having a predetermined shape or be formed of several separate elements which, when assembled together, have the predetermined shape. Usually, as a hard material, a hard metal or a sintered material is used.

The known drill bits are provided with centering tips which provide for punctual centering at the start of the drilling process, preventing skewing of a bore during large bore depths. In order to insure a proper guidance of the centering tip during drilling, the centering tip is usually noticeably axially exposed relative to the drilling head. When the drill bit is used for drilling in a reinforced concrete, often, as a result of the axial extension of the centering tip, the drill bit strikes a reinforcing iron, which leads to a breakup in the region of the centering pin. This sharply reduces the performance capability of the drill bit.

International Publication WO 01/08840 A1, discloses a drill bit with a centering tip formed by concave cutting edges of the cutting bit of the drilling head. The drawback of this drill bit consists in that the excavation rate of the drill bit is reduced in comparison with a drill bit having linear cutting edges.

German Publication DE 100 53 344 A1 discloses a drill bit having three radially extending cutting bits which are formed on radial legs of a hard material body. In the center of the body, there is provided a centering tip that projects beyond the cutting bits and is formed of flat limiting surface which stretch between linearly extending auxiliary cutting edges.

French Publication FR 2 779 366 A1 discloses a drill bit with a drilling head having three radially extending bits which are formed on radial legs of a hard material body in the center of which a centering tip is provided that projects beyond the cutting bits. As in the German Publication DE 100 53 344 A1, the tip is formed by flat limiting surfaces stretching between linearly extending auxiliary cutting edges.

A drawback of all the known drill bits consists in that the material strength in the region of the centering tip is noticeably reduced because of the pyramidal structure defined by flat limiting surfaces. As a result, the drilling speed is also reduced. Further, as a rule, the number of linearly extending, auxiliary cutting edges, which are formed by the limiting surfaces of the centering pin, is limited to the number of major cutting bits.

Accordingly, an object of the present invention is to provide a drill bit in which the foregoing drawbacks are eliminated.

A further object of the present invention is to provide a drill bit with a particularly stable centering tip and having a good excavation rate. a good excavation rate.

SUMMARY OF THE INVENTION

These and other objects of the present invention which will become apparent hereinafter are achieved by forming concave limiting surfaces between the linearly extending, auxiliary cutting edges of a drill bit.

With the pyramidal structure defined by concave limiting surfaces, the excavation rate of the drill bit is only negligibly reduced. Due to the robust shape of the centering tip, punctual drilling becomes possible and deviation of a bore is prevented, even at large bore depths. In addition, few breakups occur when the drill bit strikes a reinforcing iron. The number of limiting surfaces in the inventive drill bit can be selected in accordance with the specific requirements and is not limited any more by constructive requirements that limit manufacturing possibilities of producing the drill bit or the hard material body.

Advantageously, the centering tip is formed by four concave limiting surfaces. This embodiment forms a good compromise between the requirement for an adequate support of the centering tip and a high drilling speed.

Advantageously, a deepest location of a concavity of a concave limiting surface extends essentially along a median line between two adjacent, linearly extending, auxiliary cutting edges. In this embodiment, advantageous drilling characteristics with a high drilling speed are achieved.

Advantageously, the wedge angle of the linearly-extending, auxiliary cutting edges is smaller than the wedge angle of the cutting bits. A more sharp angle of the auxiliary cutting edges in comparison with that of the cutting bits provides for advantageous drilling behavior of the drill or the drilling head.

Advantageously, the cutting bits includes two major cutting bits and minor cutting bits, with two of the linearly extending auxiliary cutting edges being essentially aligned in an extension direction of the two major cutting bits. The foregoing arrangement of the auxiliary cutting edges improves the drilling behavior of the drill bit or the drilling head of the drill bit.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show.

In the drawings, the same elements are shown with the same reference numerals.

DETAILED DESCRIPTION OF THE PREFERRED EMBODIMENTS

Figure 1:
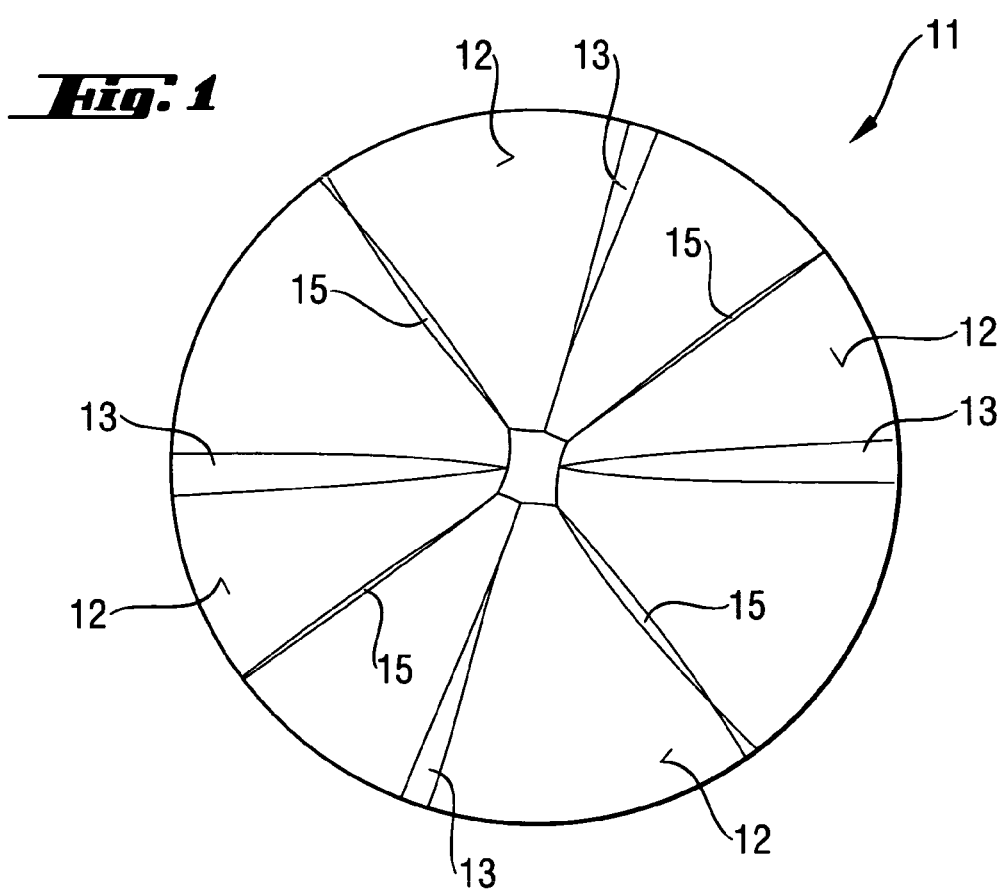
FIG. 1 a top view of a schematically shown, centering tip of the drill bit of the present invention.
Figure 2:
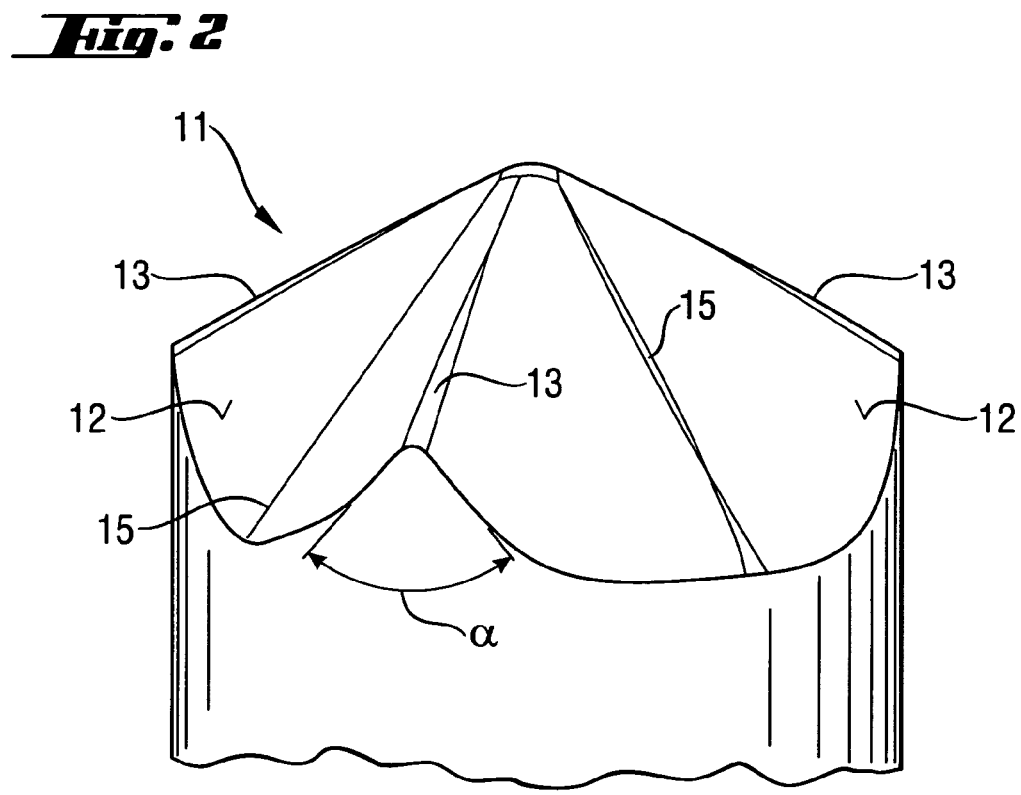
FIG. 2 a side view of the centering pin shown in FIG. 1.

As shown in FIGS. 1-4, a drill bit 1 of the present invention includes a drilling head 2 and a drill stem 4, with the drill bit 1 being attachable to a drill tool by the drill stem 4, and with the drill bit 1 including centering tip 11, which is shown in FIGS. 1-2, forming a part of the drilling head 2 of the drill bit 1. The centering pin 11 is formed of four concave limiting surfaces 12 which stretch between auxiliary cutting edges 13. The deepest location of the concavity 15 of a concave limiting surface 12 extends essentially along a median line between two adjacent, linearly extending, auxiliary cutting edges 13. The wedge angle α of the linearly extending, auxiliary cutting edges 13 is smaller than the wedge angle of a minor cutting edge (not shown here, but corresponds to a wedge angle β of the minor cutting edge 17 shown in FIG. 3) or of a major cutting edge.

Figure 3:
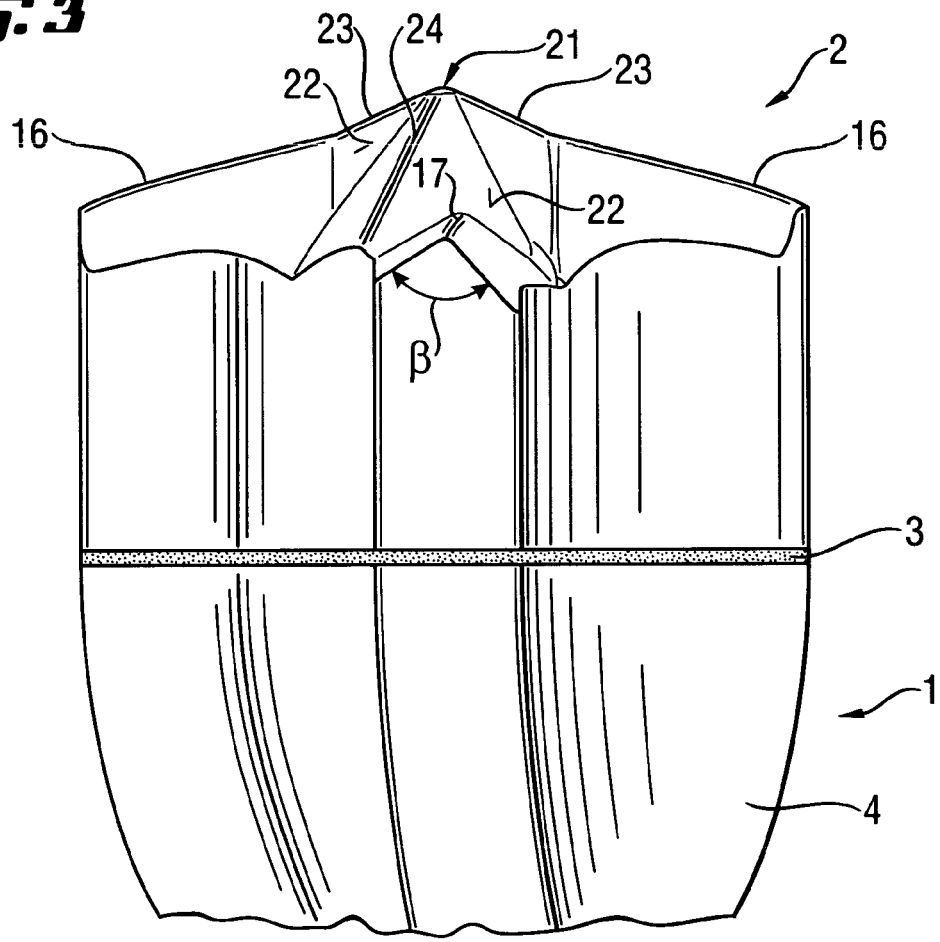
FIG. 3 a side view of the drilling head of a drill bit according to the present invention.
Figure 4:
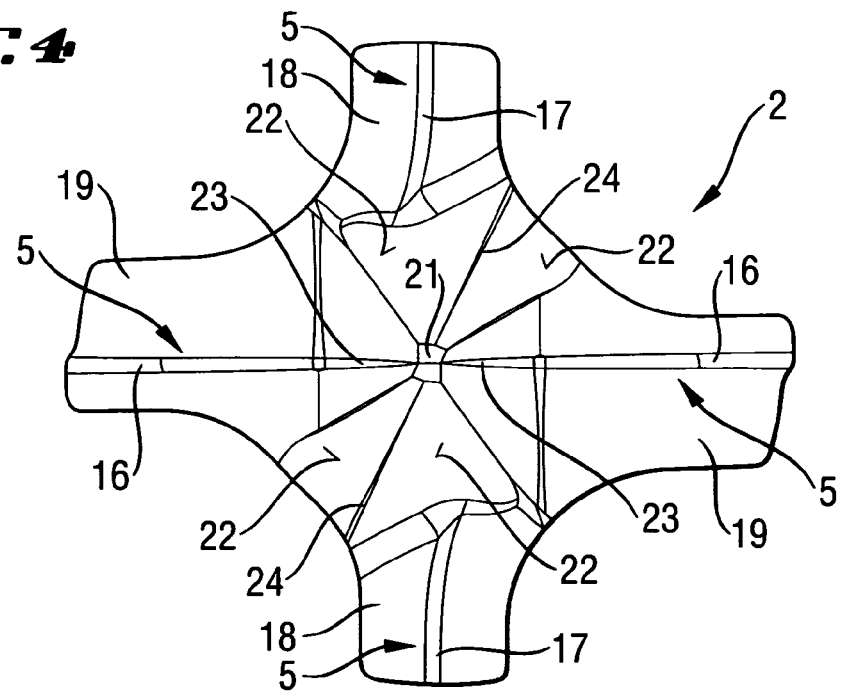
FIG. 4 a top view of the drilling head shown in FIG. 3.

The drilling head 2 of the drill bit 1, which is shown in FIGS. 3-4, is formed as a one-piece body composed of a hard metal and is connected with the drill stem 4 by a soldering connection 3. The drilling head 2 has four cutting bits 5 of which two cutting bits 5 are formed as major cutting bits 16 and two cutting bits 5 are formed as a major cutting bits 16 and two cutting bits 5 are formed as minor cutting bits 17. The major cutting bits 16 and the minor cutting bits 17 are formed on radial legs 18, 19 of the hard material body. A centering tip 21, which projects beyond the major and minor cutting bits 16 and 17 is provided in the middle of the hard material body. The centering tip 21 has concave limiting surfaces 22 which stretch between linearly extending auxiliary cutting edges 23, 24. The two linearly extending auxiliary cutting edges 23 are aligned in the direction the major cutting bits 16 extend in.

Though the present invention was shown and described with references to the preferred embodiment, such is merely illustrative of the present invention and is not to be construed as a limitation thereof and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A drill bit for use on a hammer drill comprising:
    a drilling head (2) formed entirely of a hard material as a single-piece body with radial legs (18,19) and having at least three radially extending cutting bits (5) formed on the radial legs (18, 19) of the hard material body adapted for use in operation on the hammer drill, with the radially extending cutting bits (5) being wedge-shaped in a radial direction with at least two of the radially extending cutting bits (5) having radially extending cutting edges; and
    a centering tip (11, 21) provided in a center of the hard material single-piece body and projecting beyond one of the cutting bits (16, 17), the centering tip (11, 21) having linearly extending auxiliary cutting edges (13, 23,24) and concave limiting surfaces (12, 22) stretching between the auxiliary cutting edges (13, 23, 24) adapted for use in operation on the hammer drill;
    wherein a wedge angle (α) of the linearly extending, auxiliary cutting edges (13, 23, 24) is smaller than a wedge angle (β) of the wedge-shaped cutting bits (5).

2. A drill bit according to claim 1, wherein the centering tip (11, 21) has four concave limiting surfaces (12, 22).

3. A drill bit according claim 1, wherein a deepest location of a concavity (15) of a concave limiting surface (12) extends essentially along a median line between two adjacent, linearly extending, auxiliary cutting edges (13).

4. A drill bit according to claim 1, wherein the cutting bits (5) comprise two major cutting bits (16), and wherein two of the linearly extending, auxiliary cutting edges (23) are essentially aligned in a direction of extension of the two major cutting bits (16).

* * * * *